F. KEMLO.
FISH HOOK.
No. 94,893.  Patented Sept. 14, 1869.
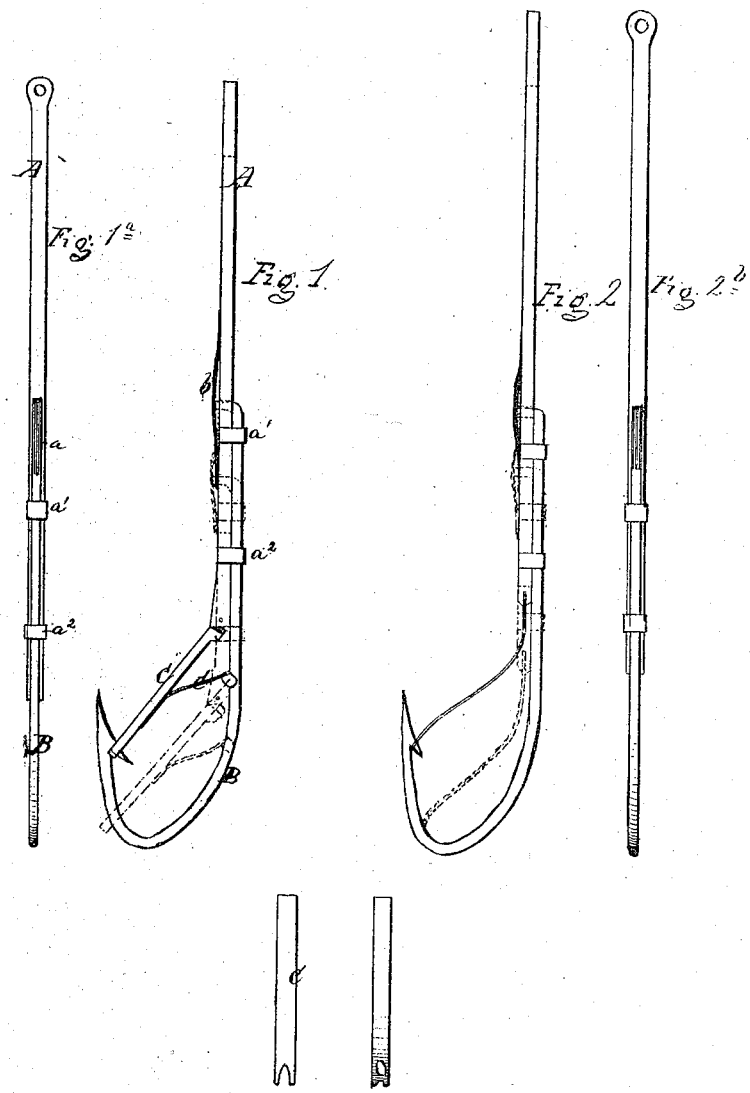

United States Patent Office.

FRANCIS KEMLO, OF BOSTON, MASSACHUSETTS.

Letters Patent No. 94,893, dated September 14, 1869.

IMPROVEMENT IN FISH-HOOKS.

The Schedule referred to in these Letters Patent and making part of the same

*To all whom it may concern:*

Be it known that I, FRANCIS KEMLO, of Boston, in the county of Suffolk, and State of Massachusetts, have invented a new and useful Improvement in Fish-Hooks; and I do hereby declare that the following is a full and exact description thereof, reference being had to the accompanying drawings, and to the letters of reference marked thereon.

Figures 1 and 1ª represent front and side views of my improved fish-hook, and

Figures 2 and 2ᵇ are similar views of a modification thereof.

My present invention relates to an improvement on a spring-lock fish-hook, for which I have just made an application for a patent; and It consists in a hook sliding on a stem, which is provided with a spring-lock, for the purpose of closing the hook after the fish has been hooked.

A represents a stem or bar, to the upper end of which the line is to be attached.

Near the central portion, a long slot, $a$, is formed, for the reception of the bent end of the shank of the hook, which moves therein, guided by the loops $a^1$ and $a^2$, which are formed on the stem below the slot.

B represents the hook, which, by means of the slot in the stem, is capable of sliding thereon.

The upper bent end of its shank extends through the slot of the stem, and its end has a spring, $b$, secured to it, which braces against this side of the stem, for the purpose of preventing the hook from sliding down by its gravity, yet allowing it to do so if a slight pull is made on it.

C is the lock, hinged to the lower end of the stem, its other slotted end extending across to the barb-end of the hook, being actuated by the spring $c$ in the manner described in my application above referred to.

The operation is as follows:

The bait having been placed on the hook in the usual manner, it is pushed up on the stem, which brings the lock down to the position shown in dotted lines, serving to hold the bait more firmly.

By the struggle of a fish, which may have been hooked, to get away, the hook will be pulled down, bringing the lock into the position shown by the full lines, closing the hook and securing the fish.

In the modification shown in figs. 2 and 2ᵇ, a spring serves the purpose of the lock for closing the hook.

Having thus described my invention,

What I claim, and desire to secure by Letters Patent, is—

The combination of the stem A, sliding hook B, and lock C, arranged to operate substantially as and for the purpose set forth.

In testimony whereof, I have signed my name to this specification, in the presence of two subscribing witnesses.

FRANCIS KEMLO.

Witnesses:
GEORGE W. GOSS,
FRANCIS A. PERRY.